United States Patent
Waks et al.

(10) Patent No.: US 11,323,602 B2
(45) Date of Patent: May 3, 2022

(54) SYSTEMS AND METHODS FOR HIGH-MAGNIFICATION HIGH-RESOLUTION PHOTOGRAPHY USING A SMALL IMAGING SYSTEM

(71) Applicants: Edo Waks, Washington, DC (US); Benjamin Shapiro, Washington, DC (US)

(72) Inventors: Edo Waks, Washington, DC (US); Benjamin Shapiro, Washington, DC (US)

(73) Assignee: Lumenuity, LLC, Wilmington, DE (US)

( * ) Notice: Subject to any disclaimer, the term of this patent is extended or adjusted under 35 U.S.C. 154(b) by 0 days.

(21) Appl. No.: 17/157,431

(22) Filed: Jan. 25, 2021

(65) Prior Publication Data
US 2021/0211563 A1    Jul. 8, 2021

Related U.S. Application Data

(63) Continuation of application No. PCT/US2020/040025, filed on Jun. 28, 2020.

(60) Provisional application No. 62/868,489, filed on Jun. 28, 2019.

(51) Int. Cl.
*H04N 5/225* (2006.01)
*H04N 5/232* (2006.01)

(52) U.S. Cl.
CPC ........ *H04N 5/2254* (2013.01); *H04N 5/2252* (2013.01); *H04N 5/2256* (2013.01); *H04N 5/2258* (2013.01); *H04N 5/232121* (2018.08)

(58) Field of Classification Search
CPC .. H04N 5/2254; H04N 5/2257; H04M 1/0264
USPC .......................................... 348/335
See application file for complete search history.

(56) References Cited

U.S. PATENT DOCUMENTS

| | | | | | |
|---|---|---|---|---|---|
| 5,517,366 | A | * | 5/1996 | Togino | G02B 17/0804 359/728 |
| 5,638,219 | A | * | 6/1997 | Medina Puerta | G02B 17/004 359/729 |
| 6,008,947 | A | * | 12/1999 | Togino | G02B 27/0172 359/630 |
| 6,021,004 | A | * | 2/2000 | Sekita | G02B 17/0896 359/676 |
| 9,555,589 | B1 | * | 1/2017 | Ambur | G02B 27/0983 |
| 2003/0218686 | A1 | * | 11/2003 | Lundgren | G02B 17/061 348/344 |
| 2005/0243439 | A1 | | 11/2005 | Tomita et al. | |
| 2011/0298935 | A1 | | 12/2011 | Segal | |

(Continued)

OTHER PUBLICATIONS

International Search Report, dated Sep. 30, 2020, from corresponding International Application No. PCT/US2020/040025.
(Continued)

*Primary Examiner* — Anthony J Daniels
(74) *Attorney, Agent, or Firm* — Greenberg Traurig LLP

(57) ABSTRACT

Imaging systems and methods are provided for taking high-magnification photographs confined to a small physical volume. In some embodiments the system is composed of at least one lens, one or more partially reflective elements, and a sensor. The partial reflectors reflect a portion of the light back and forth between them to allow a long path length for a portion of the light from the lens to the sensor which enables a high magnification.

17 Claims, 13 Drawing Sheets

(56) References Cited

U.S. PATENT DOCUMENTS

| | | | |
|---|---|---|---|
| 2015/0198784 A1* | 7/2015 | Bone | H04N 5/2254 |
| | | | 359/708 |
| 2017/0206433 A1 | 7/2017 | Ogawa | |
| 2018/0100996 A1* | 4/2018 | Svec | G02B 17/086 |
| 2018/0106936 A1 | 4/2018 | Dehkordi et al. | |
| 2019/0033207 A1* | 1/2019 | Okuyama | G02B 21/00 |
| 2019/0082093 A1* | 3/2019 | Ono | G03B 5/00 |
| 2019/0086675 A1* | 3/2019 | Carollo | G02B 27/0955 |
| 2020/0081254 A1* | 3/2020 | Tam | G02B 27/0176 |
| 2020/0117007 A1* | 4/2020 | Smithwick | G02F 1/1334 |
| 2020/0132969 A1* | 4/2020 | Huang | G02B 9/64 |

OTHER PUBLICATIONS

Written Opinion of the International Searching Authority, dated Sep. 30, 2020, from corresponding International Application No. PCT/US2020/040025.

\* cited by examiner

A1

A2

20 cm

B1

B2

0.5 cm

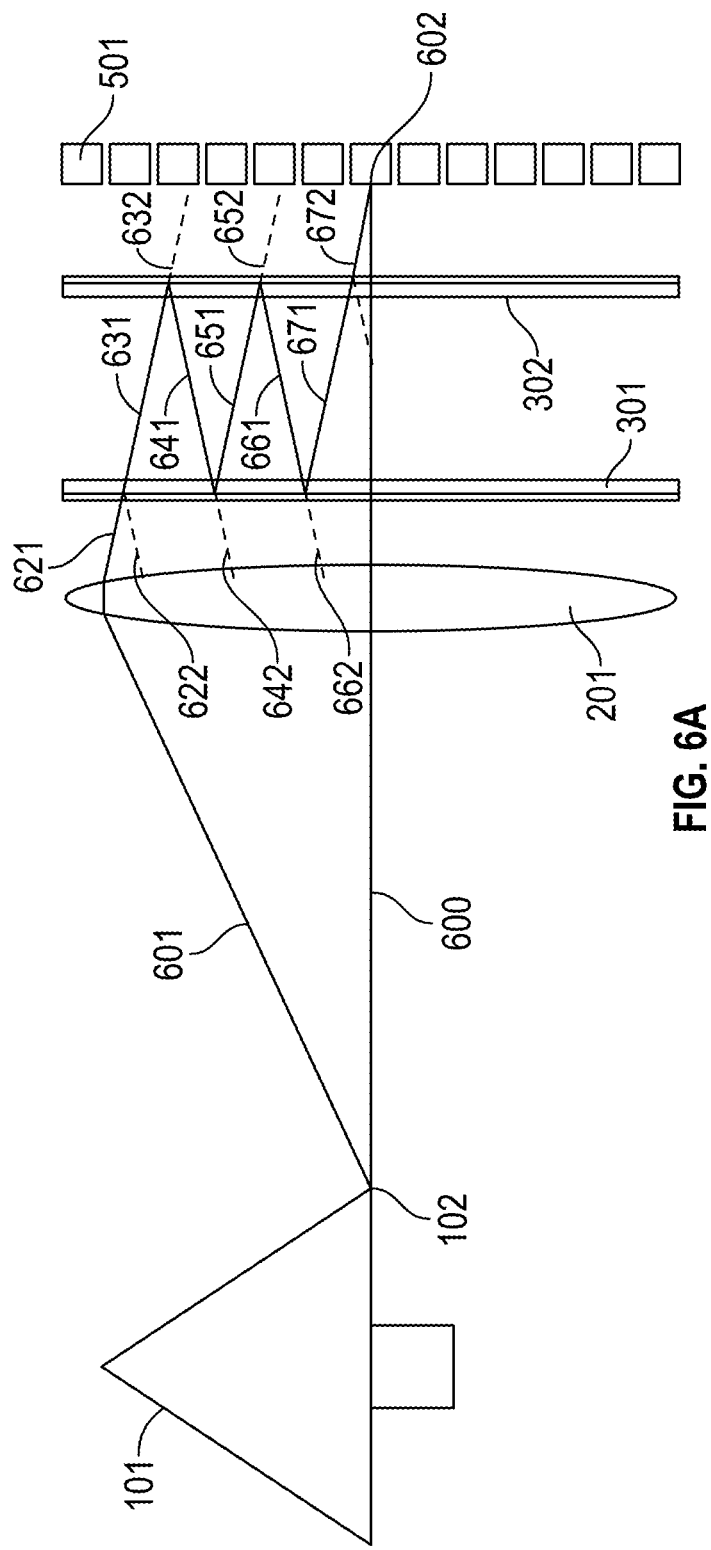
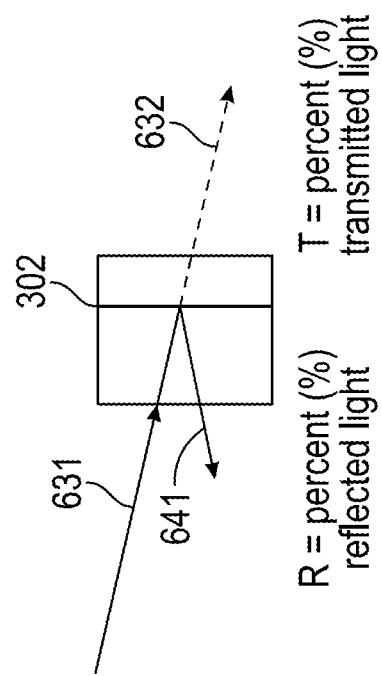
FIG. 6A
FIG. 6B

SYSTEMS AND METHODS FOR HIGH-MAGNIFICATION HIGH-RESOLUTION PHOTOGRAPHY USING A SMALL IMAGING SYSTEM

TECHNICAL FIELD

This application relates to imaging, and more particularly to image capture, and in particular but not exclusively, relates to cameras and phone cameras. This application also relates to a camera built into a smartphone, a laptop, a tablet, or any other apparatus.

BACKGROUND

Smartphone and mobile device have become compact and thin, which has limited their optical magnification. A larger optical magnification is necessary to take high-quality photographs of objects that are far away from the camera or user. Typically, large optical magnification requires a long distance between the lens and the camera sensor. Cell phones, smart phones, tablets and other mobile devices are thin, which limits the distance between the lens and the camera sensor which restricts the achievable magnification. As the dimensions of smartphones and mobile devices shrink, the camera dimensions become more and more a key factor that limits image quality.

More specifically, FIG. 2 illustrates why a long distance from lens to sensor has been required to achieve high-magnification, high-resolution image capture. The lens (201) collects light from the object (101) which is a distance (d) away from the lens, and forms an image at a distance (f) away from the lens on the camera sensor (501). The magnification of such a system can be stated as M=f/d. Thus, to get a larger magnification requires a longer distance between the lens and sensor. FIG. 2A shows the case where f=fA, where fA is a distance. In this case the image (810) formed on the sensor array is large (of size hA), and the image is well resolved on the sensor elements (sensor pixels).

In smartphone or cell phone cameras, the distance from lens to sensor cannot be made larger without increasing the thickness of the phone. Current phones use a distance f of only 4-6 mm, which is why the phones have poor magnification. Referring now to FIG. 2B, the distance between the lens and sensor is f=fB, where fB is a shorter distance because the cell phone thickness restricts the distance between the lens and sensor. Hence the resulting image (820) on the sensor array is small (of size hB), has only overlaps of a few sensor elements, and is therefore poorly resolved. This poor resolution cannot be cured by pinch zooming on the phone, since all that does is show the user the image that has been collected on the small number of sensor elements, the image resolution remains poor. With the short focal length in typical phones or tablets, high-magnification high-resolution information from far away objects is lost and cannot be recovered using current technology.

FIG. 3 further illustrates how the thickness (length or depth) of the imaging device impacts photography of far-away or long distance objects. If the image is taken with a long focal length lens, such as the lens on a DSLR camera shown in FIG. 3(A2), and correspondingly the sensor is a long distance from the lens, then a far-away object will be imaged onto many pixels and will therefore show a high degree of detail shown in FIG. 3 (A1). But if the image is taken with a small focal length lens in a cell phone shown in FIG. 3 (B2), and correspondingly the sensor is close to the lens, then the object will only be imaged on a small number of pixels and will therefore look blurry and pixelated FIG. 3(B1).

Thus, there is a need for improved imaging systems and methods to capture images in a thin device such as a cell phone, tablet, or other mobile device. It is to these needs among others, that this application is directed.

SUMMARY

This application includes methods and systems that produce an high-magnification image of further away objects from the imaging device (e.g., a cell phone camera). One embodiment includes a lens, two partial reflectors, and a sensor, which may be an imaging camera sensor or other type of light sensor. In specific examples, the distance between the lens and sensor is less than 20 mm. Light is focused by the lens, and undergoes multiple partial reflections between two partial reflectors. Each partial reflection results in a longer optical path length until the light reaches the sensor. The distance between the two partial reflectors can be selected such that a specific number of round trips between the partial reflectors forms a focused image at the sensor, while other lesser or greater number of round trips form a less focused image or desired focus.

Another aspect includes a signal processing unit that processes the output of the imaging sensor. The signal processing unit may process the sensor information in order to generate a focused image from the raw sensor data, composed of the focused image on the sensor plus the out of focus images on the sensor. The signal processing unit can be composed of a digital signal processor such as a computer, microprocessor, or field programmable gate array, or by any other means. In other implementations it may be composed of an analog signal processor. The signal processing unit may be an optical signal processor that directly performs signal processing on the optical field. In these implementations the order of the signal processing unit and sensor may be interchanged such that the optical signal processor first processes the light, and the sensor then measures it.

Another aspect includes methods and systems that include additional lenses placed before, after, or in-between the two partial reflectors. These lenses can serve a number of functions including correction for aberrations. The lens can be a glass lens, molded plastic lens, zone plate, fresnel lens, or any other optical element that achieves focusing of light. The lens could be replaced by a fresnel lens, to achieve an even thinner form factor due to the reduction in thickness of the fresnel lens.

Another aspect includes methods and systems in which one or more of the partial reflectors are replaced with a one-way mirror. A one-way mirror allows light to transmit when entering one end of the mirror, and reflect when incident from the other end. A one-way mirror may be used to reduce the amount of light that is lost out of the device and does not reach the sensor.

Another aspect includes methods and system in which some of the partial reflectors and lenses are replaced by partially-reflecting curved mirrors. A partially-reflecting curved mirror serves a combined role of a partial reflector and a focusing element, thus reducing the overall number of elements and enabling a thinner overall device. Because light reflects multiple times off of the partial reflector, a curved partial reflector with a longer radius of curvature may be used enabling both a more compact device, and also reducing aberrations. In other examples one of the curved mirrors may be replaced by a one-way curved mirror, which allows light to fully reflect from one direction and fully transmit from another direction.

Another aspect includes methods and systems to perform imaging with a device or cameras whose physical length is shorter than the distance required by the light to travel from the lens to the imaging plane. In an exemplary embodiment, the methods and systems can include a lens, two-partial reflectors, a sensor, and a signal processor, whereby light undergoes multiple partial reflections between the two partial reflectors, thereby traveling a longer distance than the physical distance between the lens and sensor. The sensor then sums the partial reflections, and the signal processing unit post-processes the signal. In some implementations the focal length of the lens and the distance between the partial reflectors may be chosen such that after a desired number of round-trip partial reflections, the lens forms a focused image on the sensor. In such methods the signal processing unit may then take the signal and reject the out-of-focus or less than focused components of the signal originating from the undesired number of round trips, and substantially retain only the signal originating from the desired number of trips.

Another aspect include methods and system in which one or more partially reflective mirrors can be replaced by one or more one-way mirrors, to reduce the round-trip losses of light. Other implementations may include addition lenses before, in-between, and/or after the partial reflectors to perform aberration correction or implement high-magnification imaging with an increased light travel length between the lenses due to multiple passes. In other implementations of the method one or more of the lenses and/or partial reflectors may be replaced by partially-reflective curved mirrors. These partially-reflective curved mirrors may be used to achieve focusing with a longer radius of curvature, thereby reducing the overall device size.

Another aspect includes an imaging system comprising a lens, a first partial reflector, a second partial reflector, and a sensor, in which light transmits through the lens, undergoes multiple partial reflections between the partial reflectors, and is subsequently imaged by the camera. The lens and the second partial reflector are a distance less than 30 mm, less than 18 mm, less than 10 mm or less than 8 mm. A signal processing unit can process the signal by the camera to form an improved image. The focal length of the lens allows light from the object(s) or scene to produces a focused image on the time-integrating sensor when undergoing a desired number of round trips between the partial reflectors.

Another aspect includes an imaging system comprising a lens, a one way mirror, a partial reflector, and a sensor, wherein light transmits through the lens, undergoes multiple partial reflections between the partial reflectors, and is subsequently imaged by the camera, wherein the lens and the second partial reflector are a distance less than 30 mm, wherein the one-way mirror fully transmits light that has passed through the lens, and fully reflects light that has been reflected from the partial reflector. The lens can be a glass lens, a molded plastic lens, a zone plate, or a fresnal lens. The plurality of partial reflectors can have an average optical reflectance of at least 5% in a pre-determined plurality of wavelengths Another aspect includes an imaging system having additional lenses that are placed before, after, or in-between the first partial reflector or the second partial reflector.

Another aspect includes an imaging system having additional lenses that are placed before, after, and/or in-between the partial reflectors.

Another aspect includes partial reflectors in which a pre-determined plurality of wavelengths are one or more continuous wavelength ranges.

Another aspect includes an imaging system in which at least one lens is replaced by at least one partially reflective curved mirror.

Another aspect includes an imaging system in which the lens has a diameter and the diameter is larger than the thickness of the system.

Another aspect includes an imaging system in which some or all of the lenses or flat partially-reflective elements are replaced by partially reflective curved mirrors.

A method to optically image an object or scene using a lens, at least two partial reflectors, a time-integrating sensor, and a signal processing unit such that incoming light undergoes multiple partial reflections before hitting the sensor, enabling the signal processing unit to generate an image a lens whose back focal length is longer than the physical distance between the lens and sensor. One or more of the partially reflective elements can be replaced by a one-way mirror. Additional lenses can placed before, after, and/or in-between the partial reflectors in order to correct for imaging aberrations. Additional lenses can be placed before, after, and/or in-between the partial reflectors in order to correct for imaging aberrations. The lens can be replaced by at least one partially reflective curved mirror. The lens can be replaced by at least one partially reflective curved mirror. Some or all of the lenses can be replaced by partially reflective curved mirrors.

Another aspect includes a camera or other smart device or the like having a lens, a first partial reflector, a second partial reflector, and a sensor, wherein light transmits through the lens, undergoes multiple partial reflections between the partial reflectors, and is subsequently imaged by the camera, wherein the lens and the second partial reflector are a distance less than 30 mm.

BRIEF DESCRIPTION OF THE DRAWINGS

FIG. 6A illustrates an exemplary reconstruction of the path of the light, and how an in-focus image is formed on the sensor plane;

FIG. 6B illustrates the partial reflection of the light in a partial reflector;

DETAILED DESCRIPTION

Specific embodiments include imaging systems or cameras and methods that include a lens, a first partial reflector, a second partial reflector, and a sensor; and may include additional elements (e.g., to allow for higher contrast, reduced chromatic aberrations, filtering light, and the like). Specific embodiments can provide images that are of high magnification, have high contrast, and have reduced imaging aberrations. Further, the imaging system or camera may be implemented in a small volume while still capturing focused, high-magnification, high-resolution images, making embodiments of the camera suitable for use in small and/or mobile multipurpose devices such as cell phones, smartphones, pad or tablet computing devices, laptops, netbooks, notebooks, subnotebooks, and ultrabook computers, and so on. Aspects of the camera (e.g., the lens system and imaging sensor or photosensor) may be scaled up or down to provide cameras with larger or smaller package sizes. Embodiments of the camera system can be implemented as stand-alone digital cameras. Embodiments of the camera system can be adapted for use in video camera applications.

One embodiment includes a system comprising a lens, a first partial reflector, a second partial reflector, and a sensor; and these elements can be within the compact thickness, depth or length of a small imaging system. The light transmits through the lens, undergoes multiple partial reflections between the partial reflectors, and is subsequently imaged by the sensor. A signal processing unit processes the signal from the imaging sensor to form an improved image. The focal length of the lens can be selected such that light from the object(s) or scene produces a focused image on the sensor when undergoing a desired number of round-trip reflections between the partial reflectors.

Figure 1:
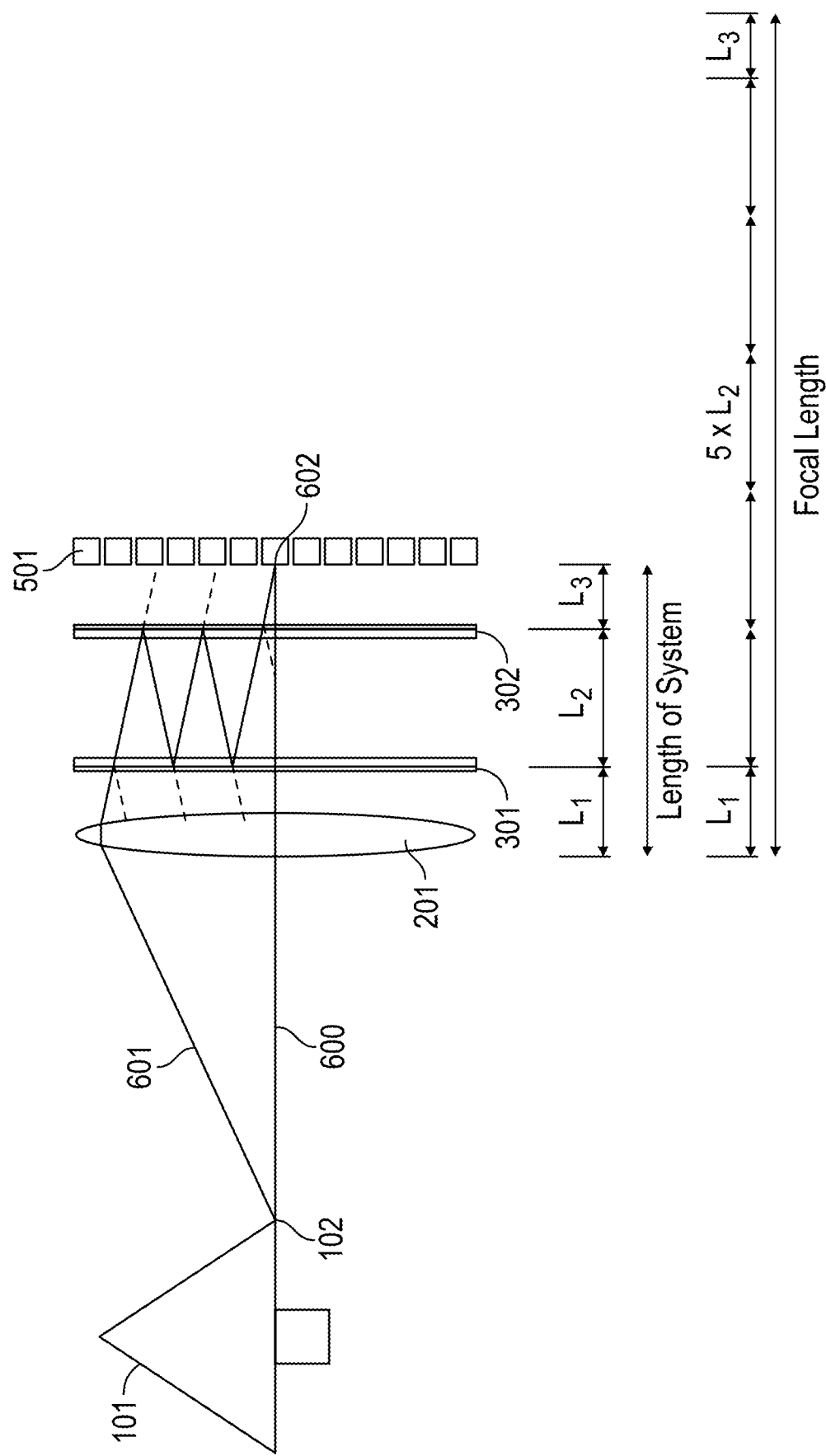
FIG. 1 illustrates an embodiment having a lens, two partial reflectors, and an imaging sensor.

FIG. 1 illustrates an exemplary embodiment. The exemplary system has a lens (201), two partial reflectors (301 and 302), and a sensor (501). The number of elements can be increased (e.g. additional lenses or partially reflective mirrors), and may include concave lens or lenses instead of or in addition to a convex lens, curved partially-reflective mirrors instead of flat ones, etc. The element can be arranged on an optical axis to transmit, focus, and reflect light from the object to ultimately the sensor. These elements can be with the compact depth of a camera system, which may be less than 30 mm, 20 mm, 18 mm, 16 mm, 14 mm, 12 mm, 10 mm, 8 mm, 6 mm, 4 mm, or the like.

The distance from the lens to the second partial reflector can be varied depending on the specific imaging system or smartphone. In some embodiments, the distance between the lens to the second partial reflector may be less than 20 mm. In some embodiments, the distance between the lens to the second partial reflector may be less than 15 mm. In some embodiments, the distance between the lens to the second partial reflector may be less than 10 mm. In some embodiments, the distance between the lens to the second partial reflector may be less than 8 mm. In some embodiments, the distance between the lens to the second partial reflector may be less than 6 mm. The focal length and/or other lens system parameters may be scaled or adjusted to meet specifications of optical, imaging, and/or packaging constraints for other camera system applications.

Figure 2:
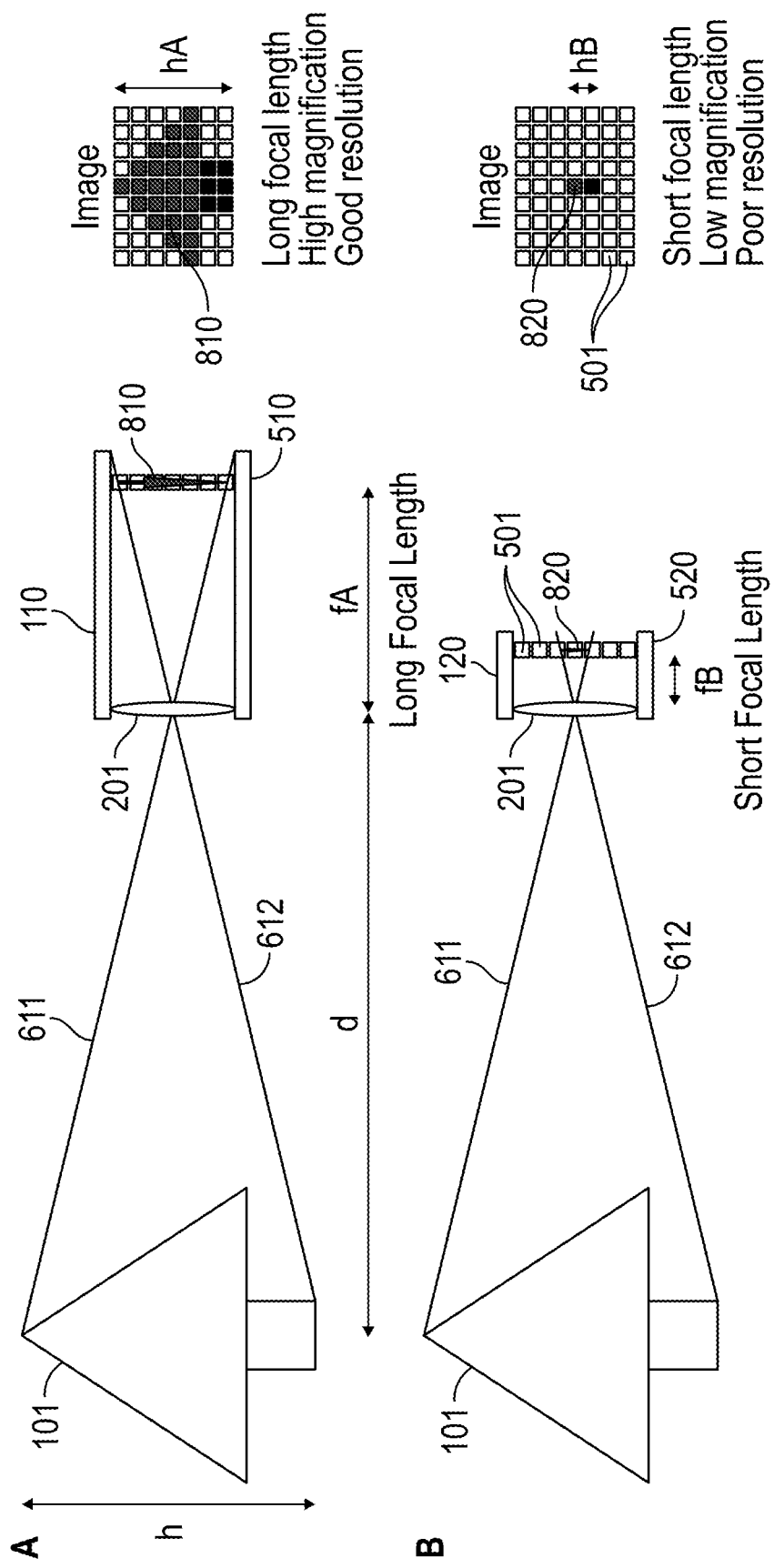
FIG. 2 illustrates the general relationship of magnification to focal length in prior art devices.
Figure 3:
FIG. 3 provides images of a monument or object taken with prior art, with a long focal length camera and a short focal length smartphone.
Figure 3:
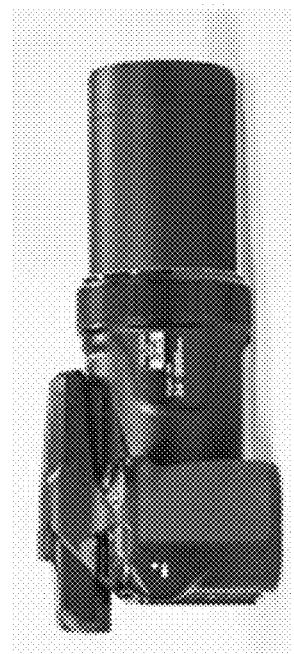
Figure 3:
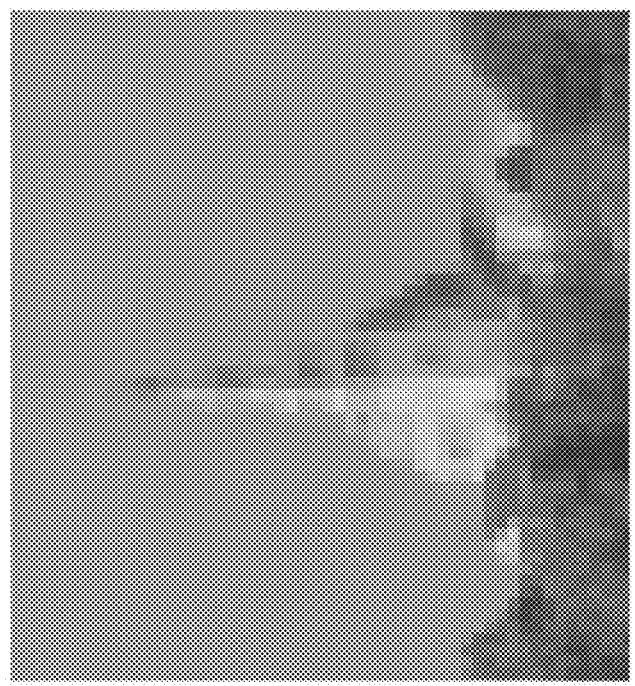
Figure 3:
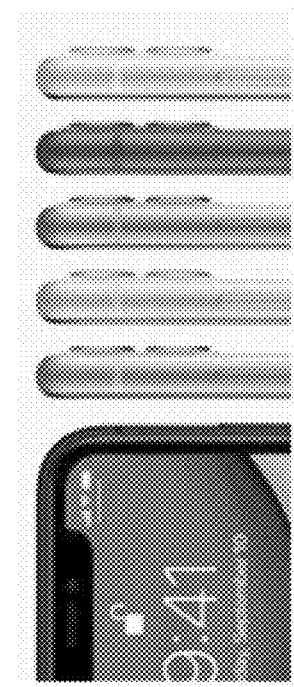

Referring back to FIGS. 2A and 3, the embodiment shown in FIG. 1 addresses or reduces the need for a long focal length to take high-magnification images. FIG. 2A show a prior-art case where the focal length f=fA is long, and a large (high magnification) image is formed on the imaging sensor (A). The image (810) overlaps many sensor elements on the imaging sensor, and therefore is accurately resolved. In contrast, FIG. 2B shows a case where the focal length f=fB is small and a small (low magnification) image is formed on the imaging sensor. This image (820) overlaps only a few sensor elements on the imaging sensor, and is therefore not well resolved. The elements shown in FIG. 2 are the object (101) of dimension h, rays (611 and 612) emanating from the tips of the object, a lens (201) that is a distance d away from the object, a long camera (110, 510) with a long focal length of fA, and a thin cell phone camera (120, 520) with a short focal length of fB, and the resulting high-magnification highly-resolved image (810) of large size hA formed by the long camera on the imaging sensor (501), versus the low-magnification poorly-resolved image (820) of small size hB formed by the cell phone camera on the imaging sensor (501).

Figure 4:
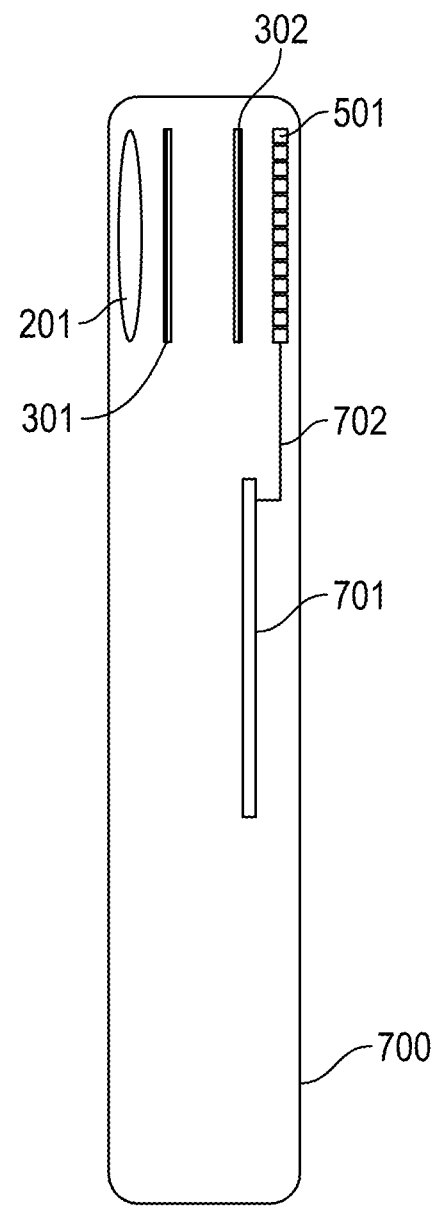
FIG. 4 illustrates an embodiment of a cellphone containing a lens, two partial reflectors, and an imaging sensor.

FIG. 4 is a cross-sectional illustration of an example compact smartphone 700 including a compact narrow imaging system that includes lens 201, partial reflectors 301, 302, image sensor 501, and processer/PCB board 701, that is connected to the sensor by connection 702. The embodiments disclosed herein can enable long focal length photographs using a compact imaging system. The disclosed imaging system that can fit inside the width and thickness of a smartphone 700. The smartphone 700 allows for focused, high-magnification imaging and/or photography of an object, objects, or scene using an imaging system contained in a compact volume. The compact volume, for example, is sufficiently small and can have a form factor (is thin enough) to be used inside a cell phone, a smart phone, a laptop, or a tablet. The imaging system allow a portion of light into the volume between them and back out, and also to allow reflections of a portion of the light back-and-forth between them (between the partial reflectors). The imaging sensor 501 can then detect the portion of the light that exits the volume between the partial reflectors 301, 302. In an exemplary setting, the portion of the light that has been partially-reflected between the partial reflectors a desired number of times and then reaches the sensor, that light may produce a focused image of the object, objects, or scene on the sensor.

Figure 5:
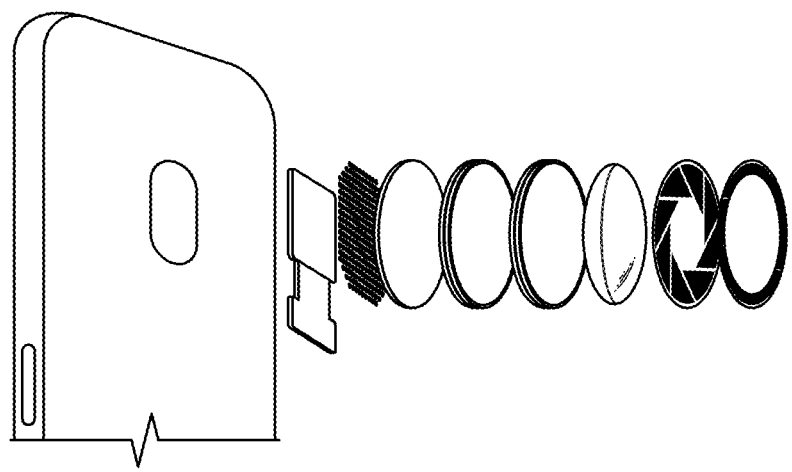
FIG. 5 illustrates an exemplary embodiment having traditional imaging elements.
Figure 5:
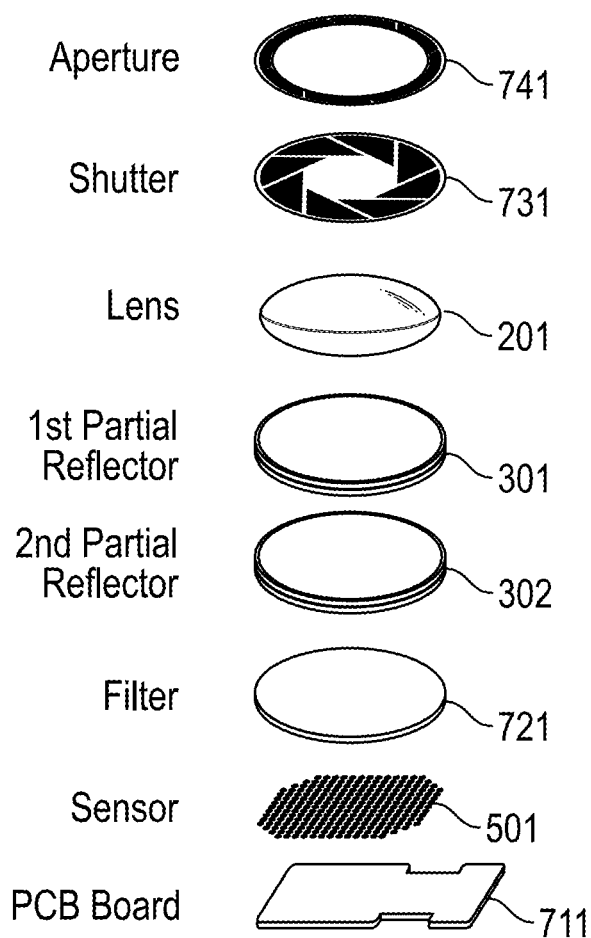

FIG. 5 is an illustration of a specific example of a compact camera 700 including the imaging system that includes an aperture 741, shutter 731, a lens 201, two partial reflectors 301, 302, a filter 721, a photo sensor or image sensor 501, and a PCB board 711. FIG. 5 illustrates additional elements that may be included in an imaging system and that is included inside a smartphone, a laptop, a tablet, or other device. In addition to a lens and two partial reflectors and an imaging sensor, these may include an aperture, a shutter, a filter or filters, a PCB board, along with other components that may be included as part of an imaging system or a camera.

FIG. 6A shows the path of light in an exemplary embodiment. It shows rays of light 600 and 601 from a point 102 on an object 101 pass through the lens 201. A fraction of the light 631 transmits through the first partial reflector 301. A fraction of this transmitted light then undergoes a desired number of partial reflections (e.g., 2 round-trip partial reflections, rays 631, 641, 651, 661, 671) between the two partial reflectors 301, 302. A fraction of this light (label 672) then transmits through the second partial reflector and reaches the sensor (label 501). In an exemplary case, the fraction of light from said object undergoes the desired number of one or more partial reflections, and produces a focused image of the object at the imaging sensor (here shown by rays 600 and 672 meeting at the point 602 on the sensor, which forms an in-focus image of point 102 of the object). In one embodiment, the partial reflector may have an average optical reflectance of at least 5% in the desired or pre-determined plurality of wavelengths and may have an average optical transmittance of at least 95% in the desired or pre-determined plurality of wavelengths. In one embodiment, the partial reflector may have an average optical reflectance of at least 10% in the desired or pre-determined plurality of wavelengths and may have an average optical transmittance of at least 90% in the desired or pre-determined plurality of wavelengths. In one embodiment, the partial reflector may have an average optical reflectance of at least 15% in the desired or pre-determined plurality of wavelengths and may have an average optical transmittance of at least 85% in the desired or pre-determined plurality of wavelengths. In one embodiment, the partial reflector may have an average optical reflectance of at least 25% in the desired or pre-determined plurality of wavelengths and may have an average optical transmittance of at least 75% in the desired or pre-determined plurality of wavelengths. The desired reflectance depends on how many partial reflections the light must undergo before forming a focused image. For small number of partial reflections, the reflectance can be set to be lower so that a larger fraction of the incident light transmits through the first partial reflector when existing the lens, or transmits through the second partial reflector before reaching the sensor. For larger number or partial reflections, the reflectance can be increased to reduce the round-trip loss. This reduction in round-trip loss comes at the expense of having less light transmit through the first partial reflector after the lens, or the second partial reflector prior to reaching the sensor. The actual reflectance used can be selected to balance off these competing losses with the optimal value depending on the respective application. In some embodiments, the desired or pre-determined plurality of wavelengths may be a single continuous range of wavelengths (e.g., a visible range of 400 nm to 700 nm) or it may be a plurality of continuous ranges of wavelengths. In some embodiments, the range of wavelengths are in the ultraviolet range.

As an exemplary case for optimally selecting the reflectance percentage R, the focused image occurs after K round trips. The transmittance T=1−R, and I as the intensity of the light hitting a pixel on the camera are used here. The component of the light with the desired number of round trips has a relative intensity of $$I_d = IT^2 R^{2K}$$

while the intensity from all of the undesired components has a relative intensity of $$I_{nd} = IT^2 \left( \frac{1}{1 - R^{2K}} - R^{2K} \right)$$

Here is disclosed selecting the reflectance percentage R to maximize the signal to background ratio $$SBR = \frac{I_d}{I_{nd}}.$$

In particular, in this exemplary instance the SBR achieves an optimal maximal value when $$R = \sqrt{\frac{K}{1+K}}.$$

This exemplary case shows how the reflectance R can be optimally selected given a desired performance metric, in this case the SBR. A person knowledgeable in the arts of optics and optimization will recognize that other metrics may also be used, and their use is anticipated and disclosed and thus the above example should not be considered limiting to the scope of the invention.

The thickness or length of the disclosed system can be stated as the distance from the start of the lens 201 to the sensor plane. Referring back to FIG. 1, in an exemplary case, this length is composed of the length L1 from the start of lens 201 to the start of the first partial reflector 301, L2 is the distance from the start of the first partial reflector 301 to the end of the second partial reflector 302, and L3 is the distance from the end of the second partial reflector 302 to the start of the imaging sensor 501. Hence the length of the exemplary system of FIG. 1 is approximately the sum of these 3 distances, plus a small amount due to the thickness of the imaging sensor and any backing materials behind the sensor.

FIG. 6A and FIG. 6B show the elements of an embodiment and the path of the light is described in further detail. In FIG. 6A, other elements of the light path that will be readily understood by someone knowledgeable in the art of optics are not shown only for reasons of simplified illustration. The exemplary point 102 on an exemplary object 101 can be imaged or photographed, and two example rays of light 600, 601 emanate from that point. Shown is the top angled emanating ray (label 601), the disclosed path of this ray and the elements that enable that light path and hence enable high-magnification imaging in a small volume. In contrast, light ray 600 is along the centerline of the system and is not at an angle, and so partial-reflections of this ray will overlay the unreflected ray 600 in the figure, and thus these partial reflections are not marked in the figure. As noted, the disclosed path of the light is described primarily for the top angled ray (ray 601). The transmissions and partial reflections of a bottom angled ray (the mirror image of 601 along the centerline, not shown) are equivalent, and are not shown only for reasons of convenience to avoid cluttering the figure. All other rays that are at angles in between the top and bottom of the lens, those rays will behave similarly, and will all also substantially emanate from point 102 and reach point 602 in-focus after two round trip partial reflections. It is understood that the physics/optics of these rays follows the same physics/optics as exemplary rays 600, 672.

In FIG. 6, the embodiment is shown with two round-trip partial reflections to generate an in-focus image at the sensor. A minimum of two round trip reflections can be one embodiment, and is not limiting, a lesser or greater number of intended partial reflections is also disclosed. In FIG. 6A, light ray 601 is transmitted through the lens 201, is bent by the lens, and comes out as ray 621. Ray 621 hits the first partial reflector (label 301) and a portion of the light is reflected back (ray 622) while another portion of that light is transmitted through the partial reflector because that reflector is partial and thus lets through a portion of the light. A portion of ray 621 thus enters the volume between the two partial reflectors (ray 631). The portion of the light labelled as ray 631 continues on and hits the second partial reflector (label 302). Now a portion of that light is transmitted (ray 632) out of the volume between the partial reflectors, but another portion is reflected (ray 641) back into the volume between the partial reflectors. Ray 631 (forward) and ray 641 (backward) comprise the first round-trip of the light between the two partial reflectors.

To in more detail illustrate the function of the partial reflectors specifically, FIG. 6B shows said light ray 631 hitting the second partial reflector (or the first partial reflector functions equally), whereby a portion of the light is reflected (e.g. a percent R of the light is reflected back, ray 641), and a portion of the light is transmitted through (e.g. a percent T of the light is transmitted, ray 632). For illustration and example purposes only, if R=60% and sixty percent of the light is reflected, then (ignoring other effects such as light scattering), substantially a portion of the light T=(1−R)=40% or forty percent of the light may be transmitted.

Now referring back to FIG. 6A, the path of light in this exemplary system continues as follows. The portion of light ray 641 that is reflected by the first partial-reflector, that ray 651 continues back into the volume between the two partial reflectors and hits the second partial-reflector again. Now a portion of ray 651 is transmitted out (ray 652) and a portion is reflected back again into the volume between the two partial reflectors (ray 661). In turn, ray 661 hits the first partial-reflector again, a portion of it is transmitted out (ray 662) and a portion is reflected back (ray 671). Ray 651 (forward) and ray 661 (backward) comprise the second round-trip of the light between the two partial reflectors.

Ray 671 hits the second partial-reflector again and a portion of it is reflected back, but the remaining portion is transmitted out (ray 672). This ray 672 hits the imaging sensor at point 602. Thus, along the preferred exemplary pathway disclosed above, a portion of the light from point 102 on object 101 traverses the lens 201, enters the volume between the two partial reflectors (301 and 302), traverses two round-trip reflections (ray 621 to 631 to 641 to 651 to 661 to 671), and then exits the volume between the two partial-reflectors through the second partial-reflector (ray 672) to hit the sensor 501 at location 602. In this exemplary setting, the other ray 600 also from point 102 on object 101, a portion of that ray also reaches the imaging sensor 501 at the same location 602. Thus the image formed on the sensor after two round-trip reflections between the partial reflectors produces a focused image of point 102 of object 101 on the imaging sensor 501. The essence of the invention is that this in-focus image is produced by a light-path that is substantially longer than the thickness of the imaging system, thus enabling a long focal length in a small and compact imaging system. The effect can be further amplified by selecting a lens with a focal length that matches the light path for 3, 4, 5, 6, . . . intended partial reflections, thus even further increasing the focal length for an imaging system still of the same small size.

The disclosed path of the portion of the light that undergoes two round-trip reflections between the partial reflectors, and which said portion arrives in focus at the imaging sensor, that light traverses a greater distance than the length (thickness) of the exemplary imaging system disclosed in FIG. 1. Specifically, the light traverses the distance between the partial reflectors five (5) times, once to cross the distance between them, and twice more for each round-trip partial reflection. Thus in an exemplary instance, for K desired round trips, the distance light travels after undergoing the desired number of round trips is given by the formula $$f = L_1 + (1+2K)L_2 + L_3.$$ [Eqn 1.]

As is evident from the formula, and from FIGS. 1 and 6A, the distance f is substantially greater than the length (thickness) of the illustrated exemplary system. The length (thickness) of the imaging system is just $L=L_1+L_2+L_3$, but the length traveled by the light is greater than L due to the amplification by multiplication factor (1+2K) of $L_2$ from the K round-trip partial reflections. Thus the distance f is longer than the length of the disclosed imaging system, because the distance between the two partial reflectors is quintuple (5×) counted (once for the first pass of light, and twice more for the two round-trip reflections). Accordingly, the magnification achieved by this imaging system is M=f/d with f according to equation (1), and this said magnification is much greater (larger) than would be achieved by prior-art systems of the same size. If the number of desired partial reflections K is selected to be larger than two, for example if it is selected to be K=3 or 4 or 5 or 6, etc., then the magnification achieved by such an imaging system will be even larger, while the size of said imaging system will remain unchanged at $L=L_1+L_2+L_3$.

In exemplary embodiments, e.g., FIG. 1 and FIG. 6A, the intended number of round-trip partial reflections is two (K=2) and the portion of the light that arrives from the object to the sensor after two round-trip partial reflections is in-focus at the imaging sensor. The images of the object formed by portions of the light that arrive at the imaging sensor with less than K reflections (e.g. after no or one round-trip partial reflection) or that arrive at the imaging sensor with more than K reflections (e.g. after three or more round-trip partial reflections), those images will be out of focus.

Figure 7:
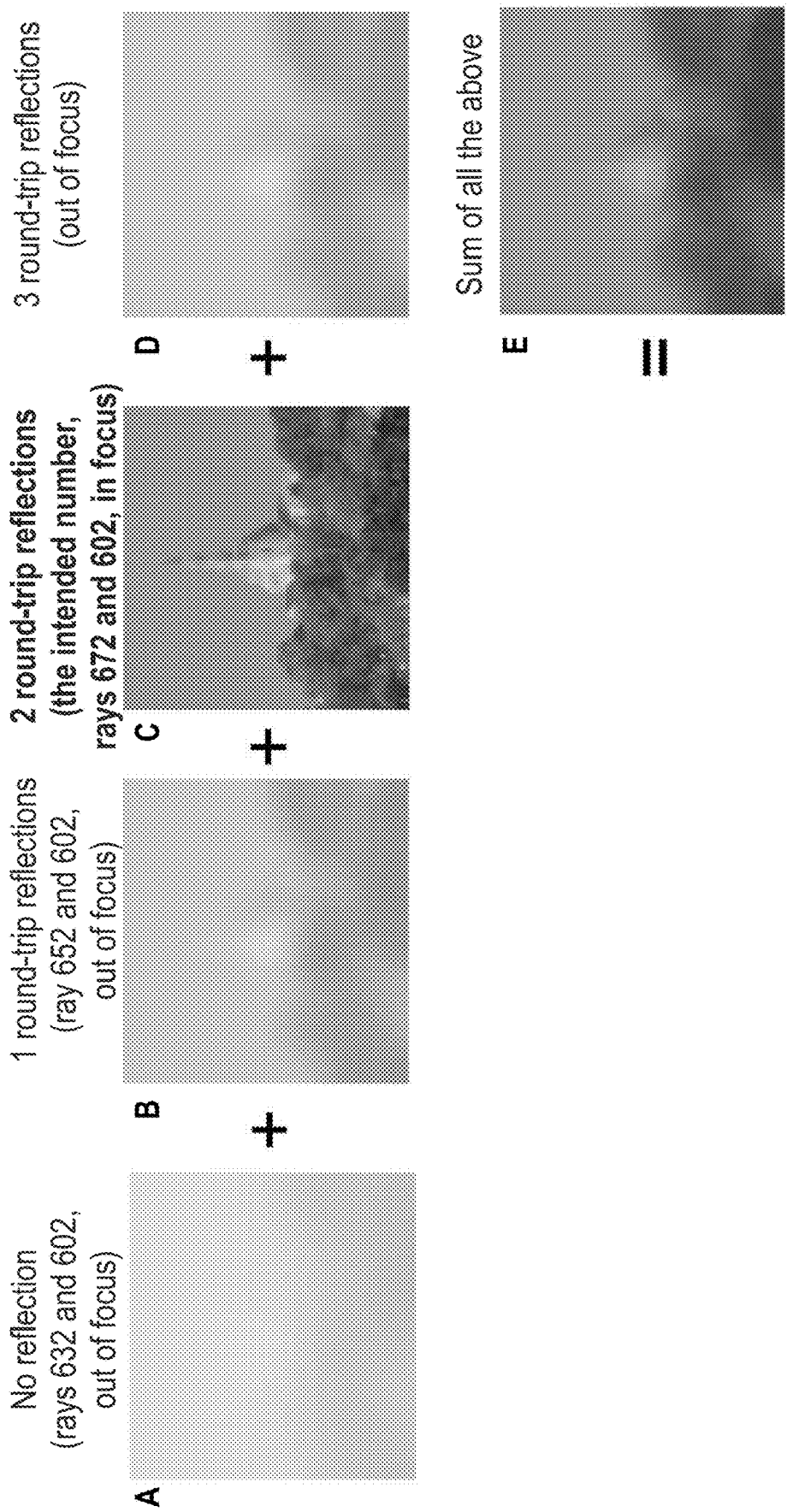
FIG. 7 illustrates images after none, one, two, and three round-trip partial reflections, and also shows the resulting total image.

FIG. 7 illustrates images of an object obtained after zero, one, two, and three round-trip partial reflections, along with their sum that is collected on the image sensor. Here the lens focal length has been selected to match light path-length for two round-trip partial reflections, hence the third image (panel C) is in-focus, while the other partial reflections are out-of-focus. FIG. 7 shows in further detail how the current invention functions to provide high-magnification images by exploiting partial-reflections. A building was photographed at a long distance (2 miles). FIG. 7 shows a reconstruction of the image formed on the imaging sensor after zero, one, two, and three round-trip reflections. As previously, the intended number of partial reflections is two (K=2), meaning that the lens focal length has been chosen to be consistent with equation (1) for K=2. Panel A shows the image that is formed by the portion of the light that arrives at the sensor with no partial reflections (k=0), for the exemplary embodiment of FIG. 1 and FIG. 6A, this image is out of focus. Panel B shows the image after one round-trip partial reflection (k=1), this image is also out of focus. Panel C shows the image after two round-trip partial reflections (k=K=2), this image is in focus. Panel D shows the image after three round-trip partial reflections (k=3), this image is again out of focus. The total image formed at the location of the imaging sensor is the sum of all images for k=0, 1, 2, 3, 4, etc. This resulting total image is shown in Panel E. Since only one of the sub-images that makes up the total image, the sub-image for k=2=K partial reflections, is in focus, this is the image component that is most apparent in the total image formed.

To further improve the quality of the total image, the out-of-focus sub-image components for the number of partial-reflections that do not match the desired number of partial-reflections (for k K, i.e. for k=0, 1, 3 and 4, 5, . . . ), the effect of these out-of-focus sub-images can be removed by imaging algorithms disclosed and described herein.

Figure 8:
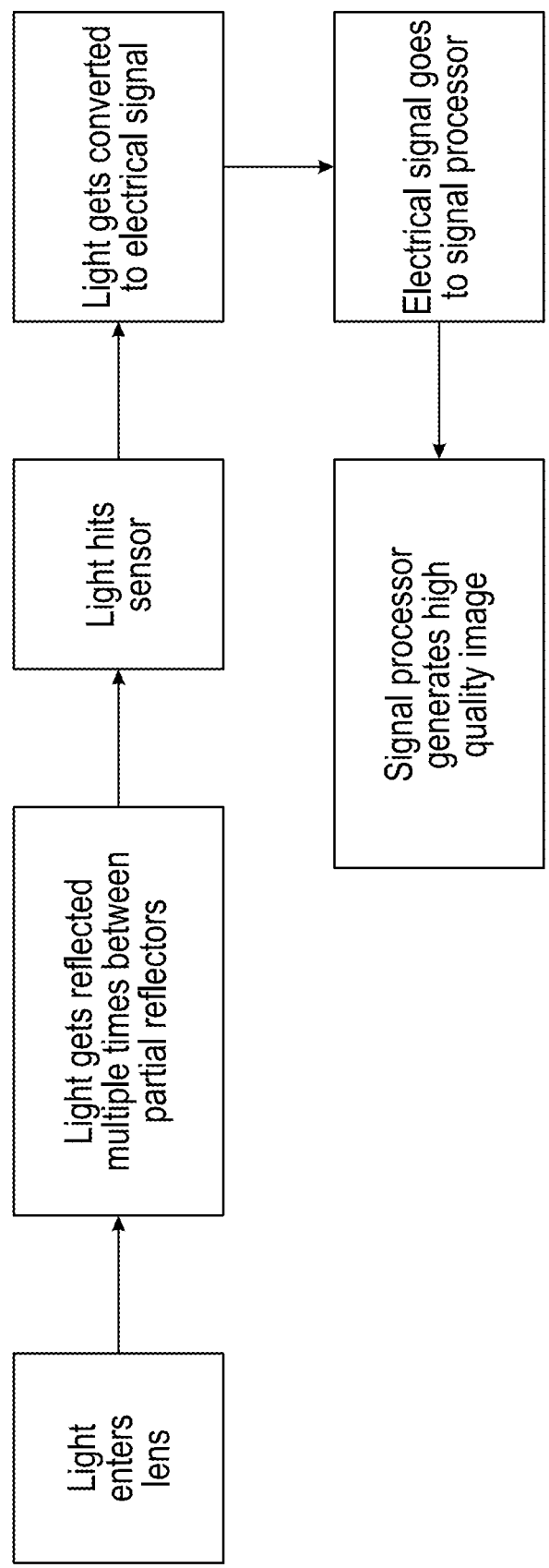
FIG. 8 is a flow diagram of an exemplary method for capturing a high-resolution image at a distance.

In operation and use and as shown in FIG. 8, an exemplary method for signal processing, to substantially extract the in-focus image after the intended number of round-trip partial reflections. Disclosed is the path of light through the imaging system. Specifically, in an embodiment, light enters through the lens. Part of the light gets reflected an intended number of times between partial reflectors. A portion of that light exits the volume between the partial reflectors and reaches an imaging sensor. The sensor converts the light to electrical signals, and those go to a signal processor. The signal processor generates a high quality image, for example by removing out-of-focus components from the image, as disclosed herein.

Figure 9:
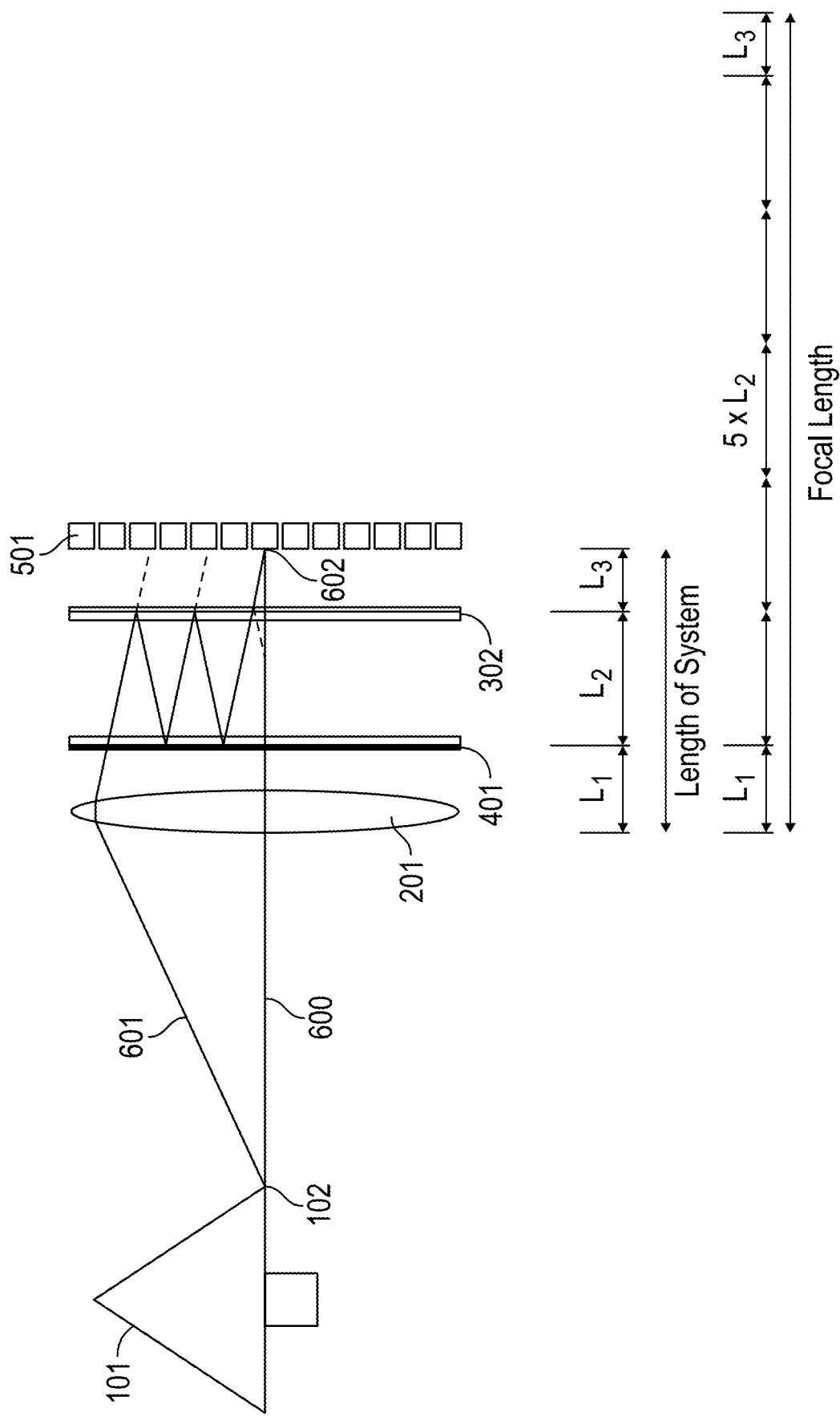
FIG. 9 illustrates an embodiment having a lens, a one-way mirror, a partial reflector, and an imaging sensor.

In another embodiment (e.g., FIG. 9), a first partial reflector can be replaced with a one-way mirror (401) that fully transmits light that has passed through the lens, and fully reflects light that has been reflected from the second partial reflector. A partial reflector reflects a fraction R of the light and transmits a fraction T regardless of whether the light is incident from the left or the right. In contrast, a one-way mirror (element 401 in FIG. 9), fully transmits incident from one direction (e.g. from the left), and fully reflects light incident from the other direction (e.g. from the right). Replacing one or more of the partial reflectors with one-way mirror(s) may confer advantages of reducing the amount of light that is lost out of the device. Labels in FIG. 9 are as previously for repeated elements, specifically: object 101, point on object 102, light rays 600 and 601 emanating from that point, focusing lens 201, the first partial reflector has been replaced by the one-way mirror 401, and 302 is the remaining partial reflector, there is an imaging sensor 501, and point 102 is focused to point 602 on the sensor after the intended two round-trip partial reflections. The focal length of the system is $f=L_1+5 L_2+L_3$, as per equation (1), and due to the partial reflections that is substantially longer than the thickness of the device $L=L_1+L_2+L_3$.

A person knowledgeable in the art of optics will recognize that there are many different types of lenses. These lenses may serve a number of functions including correction for aberrations. The lens or lenses used could be one of the following, or a combination of these: a glass lens, molded plastic lens, zone plate, Fresnel lens, or any other optical element that achieves focusing of light. For example, a lens or lenses could be replaced by a Fresnel lens, to achieve an even thinner form factor due to the reduced thickness of a Fresnel lens compared to a conventional lens.

Figure 10:
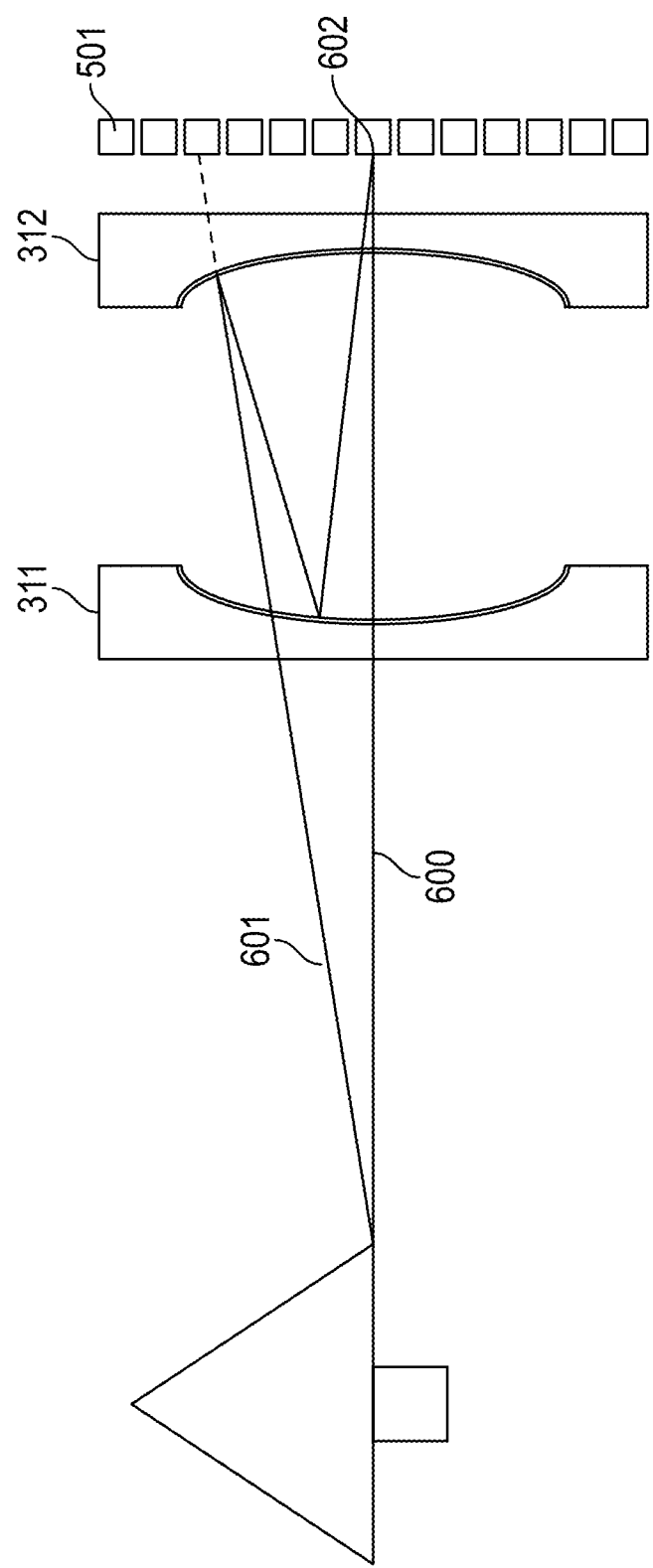
FIG. 10 illustrates an embodiment with two inward facing partially-reflective curved mirrors and an imaging sensor.

FIG. 10 shows another embodiment in which a lens and two partial reflectors may be replaced with partially reflecting curved mirrors. Curved mirrors can have the same functionality as lenses by focusing light rays (now by reflection instead of by transmission), but can confer advantages of no or less chromatic aberrations. This arrangement for partial reflections can increase the effective path of light and to increase focal distance by the use of partially-reflecting curved mirrors, which may be used instead of or in addition to a lens or lenses and flat partial reflectors. Referring to FIG. 10, the exemplary device is composed of a first partially reflecting concave curved mirror (311), a second partially reflecting concave curved mirror arranged in the opposite direction (312), and an imaging sensor (501). Other elements in the figure include an object with an exemplary point, two emanating rays (600 and 601), and their focus at point 602 on the imaging sensor after one intended round-trip partial reflection. As illustrated by this example, different numbers of intended partial reflections are anticipated and disclosed. Previously, in FIG. 6, two intended round-trip partial reflections were shown; here in FIG. 10 one intended round-trip reflection is shown, and the curvature of the partially-reflecting mirrors would be selected so that the focal length matches the light path length for one intended partial reflection. A different curvature could be selected for two, three, four or more intended partial-reflections, and such a selection is anticipated and disclosed.

It is understood that the number of elements may increase (e.g. additional lenses or mirrors), their form may change (e.g. one of the partial reflectors may be flat instead of curved), or additional elements may be placed in the system. Adding elements may be beneficial for further improving system performance, for example to increase contrast, reduce aberrations, reduce distortion, etc.

Figure 11:
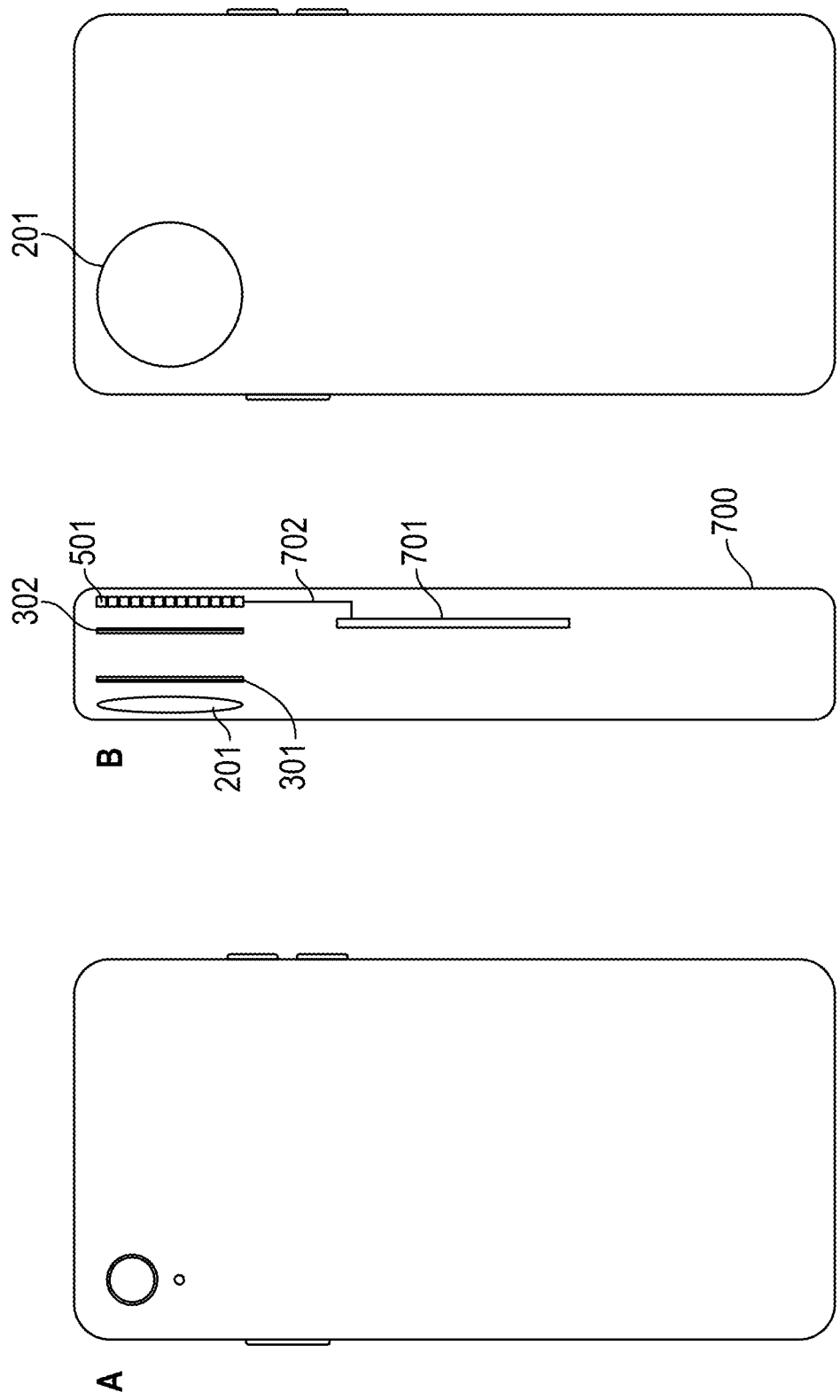
FIG. 11 illustrates another embodiment in which a phone has a lens with a larger diameter.

FIG. 11 shows smartphone 700 with a larger lens diameter 201 (right, FIG. 11B) compared to the smaller version (left, FIG. 11A). For example, a diameter between 1 mm and 30 mm could be used. Existing prior art that puts imaging systems in a thin form factor uses small diameter lenses, because the focal length is small and using a large diameter lens would not provide a benefit. The invention and embodiments disclosed herein enable long focal lengths and enables larger diameter lenses to provide benefits, such as sharper images and greater light collection that can be useful for low-light photography which can benefit from larger lenses.

Figure 12:
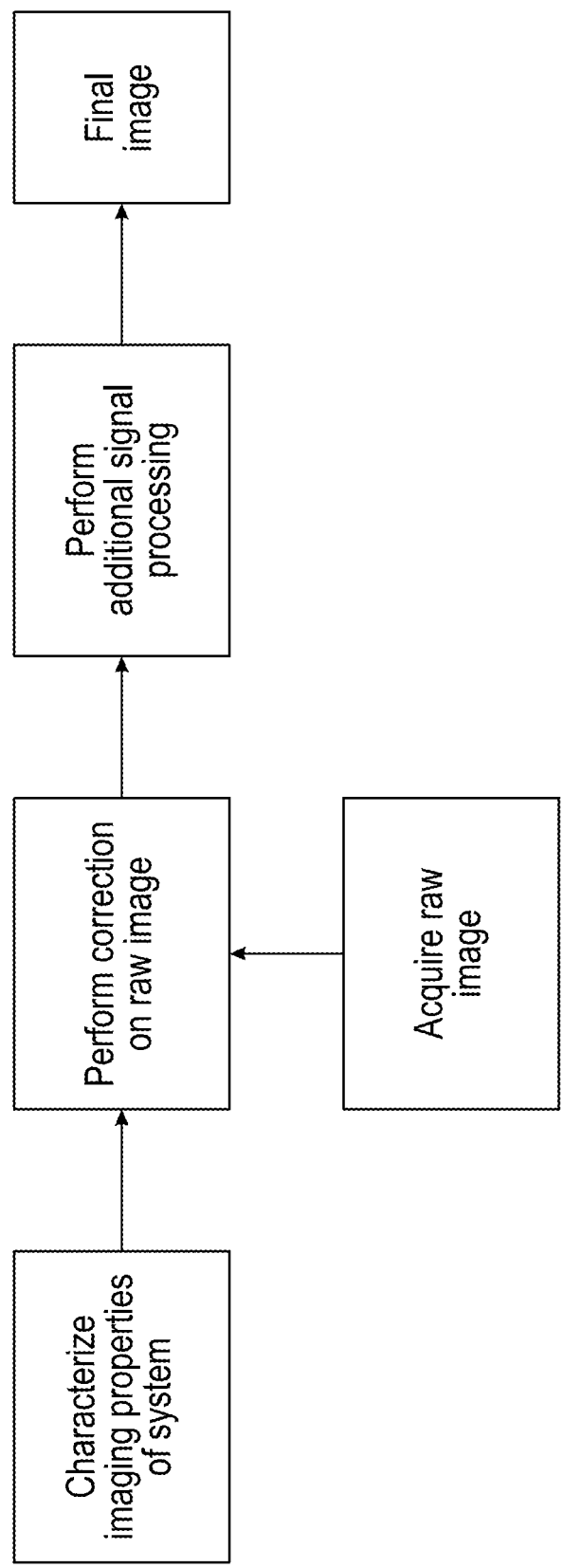
FIG. 12 shows a flow diagram of an exemplary method for image acquisition and signal processing.

In operation and use and as shown in FIG. 12, image processing and extraction may be performed using techniques known to those of ordinary skill in the art. In order to reconstruct the in-focus image from the raw distorted image that includes the out-of-focus components shown in FIG. 7(A, B, D), the image processing method in FIG. 12 can be used create a focused image. In one example, first the point spread function of the imaging system is measured by imaging a small object far away onto the sensor. The resulting image is composed of the tightly focused object plus the out-of-focus components caused by light that underwent the undesired number of partial reflections. Using this point spread function, the original image can be reconstructed using various disclosed approaches listed below.

Method 1: If the out of focus components are larger than the imaging sensor, then they form a substantially constant background level. In these cases, this method provides reconstructing the desired image by adjusting the dark level of the imaging system, either by image post-processing or in the hardware.

Method 2: In some cases, if the out-of-focus image is highly blurry the in-focus image can be reconstructed using high-pass filtering to reject the low-frequency background.

Method 3: Using the point-spread-function, the desired image can be reconstructed using deconvolution digital signal processing techniques which are known to one skilled in the art of signal processing.

EXAMPLE

Figure 13:
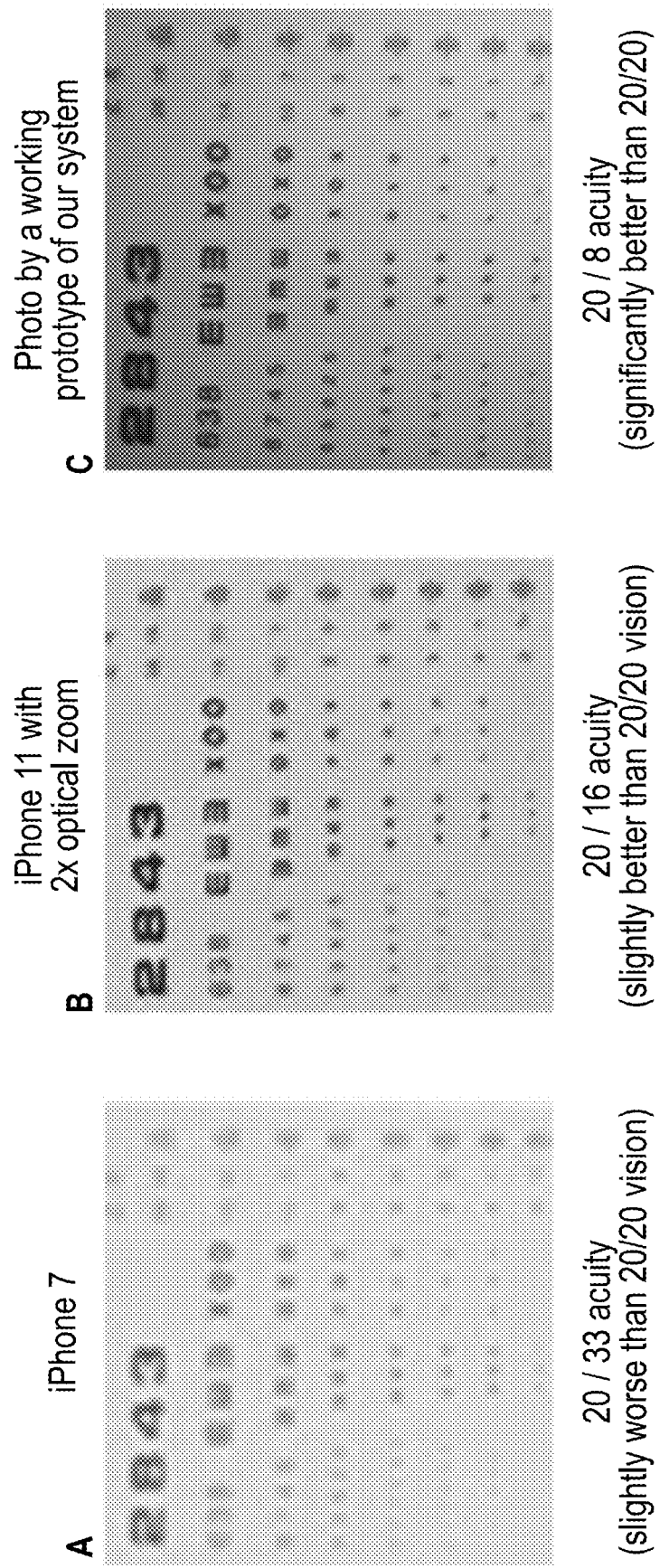
FIG. 13 shows experimental images a Snellen eye chart taken though an Iphone7, and Iphone11 with a 2× zoom, and an example of the embodiment shown in FIG. 1.

FIG. 13 compares the magnification achieved by a prototype of the exemplary device. The image on the left (FIG. 13(A)) is from an iPhone7, the image in the middle (FIG. 13(B)) is from iPhone11pro with 2× optical magnification, and the image on the right (FIG. 13(C)) is from an exemplary device. In the exemplary device, L1=4 mm, L2=5 mm, and L3=2 mm as defined in FIG. 1. A quantitative comparison of the magnification achieved by each device was carried out by using a doctor's office Snellen eye exam chart, as described next.

When used in a patient setting, the patient views a Snellen eye chart from a prescribed distance (e.g. from 20 feet) and attempts to read rows with successively smaller text. Each row corresponds to a certain level of visual acuity. If the bottommost row that the patient can read is the 20/40 row, then that means that at a distance of 20 feet the patient can only read letters that the average person can read even at 40 feet. Thus 20/40 vision is worse (is lower acuity) than what is defined as average vision. When a person has 20/20 vision that means this person can see clearly at a distance of 20 feet what should, on average, be seen at that distance. 20/15 vision means that the bottommost row that the patient can read when at a distance of 20 feet from the chart is the 20/15 row, and this row corresponds to letters that an average person would have to stand closer, to within 15 feet from the chart, to read. Thus 20/15 vision corresponds to visual acuity that is better than what is defined as average vision.

In the context of cameras, the Snellen chart can be used to quantitatively measure camera magnification and resolution. The lowest row that was readable in each photograph indicated the visual acuity (magnification and resolution) that was achieved by that device. All photographs of the Snellen chart were taken at the same distance from the chart. Snellen chart readings directly correspond to the smallest angle that can be distinguished by the visual system (eye or camera) and so directly represent magnification and resolution.

FIG. 13(A) shows that an iPhone7 achieved a visual acuity of 20/33 (the bottommost line that could be clearly read in a photograph taken by the iPhone 7 was the 20/33 line) and this 20/33 vision corresponds to visual acuity (magnification and resolution) that is worse than 20/20 vision. FIG. 13(B), for photographs taken by the iPhone 11 pro with 2× optical magnification, the bottommost row that could be clearly read in the photograph was the 20/16 row, and this 20/16 vision is slightly better (1.25× better) than 20/20 vision. FIG. 13(C), for photographs taken by our exemplary prototype, the bottommost row that could be clearly read in the photographs was the 20/8 row, and this 20/8 is significantly better than 20/20 vision (2.5× better). The magnification of our exemplary prototype was 4.125× better than the iPhone 7 camera and 2× better than the iPhone 11 camera (33/8=4.125× and 16/8=2×). This visual acuity directly translates to being able to see more image detail, specifically to identify smaller features in the image, which is precisely the benefit provided by a higher magnification system.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An imaging system comprising:
   a lens having a focal length and configured to transmit light;
   a first partial reflector;
   a second partial reflector,
   wherein the transmitted light undergoes one or multiple round-trip reflections between the first partial reflector and the second partial reflector;
   a time-integrating sensor configured to capture a raw image corresponding to focused and unfocused light exiting the second partial reflector; and
   a signal processing unit configured to reconstruct an in-focus image from the raw image,
   wherein the lens, the first partial reflector, the second partial reflector, and the time-integrating sensor are aligned substantially along an optical axis, and a distance between the lens and the time-integrating sensor is less than the focal length.

2. The imaging system of claim 1, wherein the imaging system has a thickness including the lens, the first partial reflector, the second partial reflector and the time-integrating sensor, of less than 30 mm.

3. The imaging system of claim 2, wherein the lens has a diameter and the diameter is larger than the thickness of the imaging system.

4. The imaging system of claim 1, wherein the time-integrating sensor is a Charge Coupled Device (CCD) or a Complementary Metal Oxide Semiconductor (CMOS) array.

5. The imaging system of claim 1, wherein the lens, the first partial reflector, the second partial reflector, and the time-integrating sensor are enclosed within a mobile device.

6. The imaging system of claim 1, wherein the lens, the first partial reflector, and the second partial reflector are arranged to produce the focused light when the transmitted light undergoes a desired number of round-trip reflections between the first partial reflector and the second partial reflector.

7. A method to produce an in-focus image of an object using a mobile device, comprising:
   transmitting light through a lens having a focal length;
   acquiring, using a sensor, a raw image corresponding to a sum of focused and unfocused light resulting from one or more round-trip partial reflections of the transmitted light occurring between two or more partial reflectors that are aligned substantially along a common optical axis; and
   reconstructing the in-focus image from the raw image.

8. The method of claim 7, further comprising displaying the in-focus image on a screen of the mobile device.

9. The method of claim 8, wherein the mobile device has a thickness including the lens, the two or more partial reflectors and the sensor, of less than 30 mm.

10. The method of claim 8, wherein the sensor is a time-integrating sensor.

11. The method of claim 10, wherein the time-integrating sensor is a Charge Coupled Device (CCD) or Complementary Metal Oxide Semiconductor (CMOS) array.

12. The method of claim 7, wherein the reconstructing the in-focus image comprises processing the raw image using a background subtraction, high-pass filtering, or deconvolution algorithm.

13. The method of claim 7, wherein a distance between the lens and the sensor is less than the focal length.

14. The method of claim 7, wherein the lens and the two or more partial reflectors are arranged to produce the focused light when the transmitted light undergoes a desired number of round-trip reflections between the two or more partial reflectors.

15. A mobile device comprising:
- a lens having a focal length and configured to transmit light;
- a first partial reflector;
- a second partial reflector,
  - wherein the transmitted light undergoes one or multiple round-trip reflections between the first partial reflector and the second partial reflector;
- a time-integrating sensor configured to capture a raw image corresponding to focused and unfocused light exiting the second partial reflector; and
- a signal processing unit configured to reconstruct an in-focus image from the raw image,
- wherein a distance between the lens and the time-integrating sensor is less than the focal length, and the lens, the first partial reflector, the second partial reflector, and the time-integrating sensor are enclosed within the mobile device.

16. The device of claim 15, wherein the mobile device has a thickness including the lens, the first partial reflector, the second partial reflector and the time-integrating sensor, of less than 30 mm.

17. The device of claim 15, wherein the time-integrating sensor is a Charge Coupled Device (CCD) or Complementary Metal Oxide Semiconductor (CMOS) array.

\* \* \* \* \*